United States Patent [19]
Schlameus et al.

[11] Patent Number: 5,897,732
[45] Date of Patent: Apr. 27, 1999

[54] METHOD AND APPARATUS FOR THE MANUFACTURE OF A LINEAR WRAP, THERMALLY INSULATED TUBE

[75] Inventors: David L. Schlameus, New Braunsfels; Donald W. Hirsch, San Marcos, both of Tex.

[73] Assignee: Thermon Manufacturing Company, San Marcos, Tex.

[21] Appl. No.: 08/887,501

[22] Filed: Jul. 2, 1997

[51] Int. Cl.$^6$ .................................................. B29D 23/00
[52] U.S. Cl. ......................... 156/201; 156/203; 156/465
[58] Field of Search .................................. 156/201, 200, 156/203, 217, 465, 466

[56] References Cited

U.S. PATENT DOCUMENTS

| | | |
|---|---|---|
| 1,884,554 | 10/1932 | Briggs . |
| 3,259,533 | 7/1966 | Philipson . |
| 3,269,422 | 8/1966 | Matthews et al. . |
| 3,315,703 | 4/1967 | Matthews et al. . |
| 3,490,972 | 1/1970 | Rogers . |
| 3,511,729 | 5/1970 | Williams . |
| 3,519,519 | 7/1970 | Basso . |
| 3,524,779 | 8/1970 | Masters et al. . |
| 3,552,445 | 1/1971 | Andrews . |
| 3,594,246 | 7/1971 | Arovelius . |
| 3,687,765 | 8/1972 | MacLean et al. . |
| 3,727,029 | 4/1973 | Chrow . |
| 3,744,505 | 7/1973 | Huvey et al. . |
| 3,778,322 | 12/1973 | Keith et al. . |
| 3,784,785 | 1/1974 | Noland . |
| 3,816,043 | 6/1974 | Snelling et al. . |
| 3,932,727 | 1/1976 | True . |
| 3,993,531 | 11/1976 | Davila et al. . |
| 4,211,595 | 7/1980 | Samour . |
| 4,284,352 | 8/1981 | Carson et al. . |
| 4,307,053 | 12/1981 | Daws et al. . |
| 4,329,539 | 5/1982 | Tanaka et al. . |
| 4,436,568 | 3/1984 | Rasmussen . |
| 4,523,637 | 6/1985 | Abramo . |
| 4,570,680 | 2/1986 | Ratti . |
| 4,590,108 | 5/1986 | Nippe . |
| 4,641,423 | 2/1987 | Crandell . |
| 4,679,598 | 7/1987 | Jee . |
| 4,795,126 | 1/1989 | Crandell . |
| 4,979,296 | 12/1990 | Langner et al. . |
| 5,094,088 | 3/1992 | Davis . |
| 5,390,481 | 2/1995 | Langner . |
| 5,400,602 | 3/1995 | Chang et al. . |
| 5,513,949 | 5/1996 | Armstrong . |
| 5,567,505 | 10/1996 | Dehennau et al. . |

*Primary Examiner*—Jeff H. Aftergut
*Attorney, Agent, or Firm*—Pravel, Hewitt & Kimball

[57] ABSTRACT

The invention pertains to the apparatus and process for shaping and forming of thermal insulation materials around tubes and pipes in a continuous production process wherein the tube or pipe and a long singular strip of insulating material passes linear with the tube or pipe through a shaping die. The shaping die forms the insulating material around the circumference of the tube or pipe without substantial compression and is captured by overlapping coils of helical wound tape, wire or like material.

18 Claims, 3 Drawing Sheets

METHOD AND APPARATUS FOR THE MANUFACTURE OF A LINEAR WRAP, THERMALLY INSULATED TUBE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to a method and apparatus for the continuous manufacture of an insulated pipe, and more specifically, to a method and apparatus of manufacturing a linear wrap, thermally insulated tube.

2. Description of the Related Art

Pre-insulated tubes are frequently used in the process industry to transport steam, condensate and other hot or cold fluids. Tubes are also insulated and specifically designated as steam tracer lines for process piping. The operation of pumping a fluid through a process pipeline frequently requires that the process pipeline be heated to prevent the fluid from freezing, condensing or becoming too viscous to pump through the pipeline. Heating and maintaining the proper temperature of the process pipeline, which aids in the flow of the process fluids, is often accomplished by attaching a heat transfer tube or tracer line directly to the external surface of the process pipe. Often high temperature steam is available for use as the heating medium but will frequently deliver too much heat for low temperature or temperature sensitive applications. Hence an "isolated" tracer line or tube with insulation formed around it and having polyvinyl chloride (PVC), polyethylene or other moisture protecting polymeric jacket covering the insulation, is sometimes selected to retard the heat flow for such applications. Substantially accurate and consistent thermal conductivities of the insulating material used for both the tubes transporting hot or cold fluids and the "isolated" tracer tube is essential. The thermal conductivity or K value describes the rate at which heat is conducted through a specific material.

The pre-insulated transport lines must be energy efficient and provide a high degree of personnel safety by limiting the surface temperature of the pre-insulated lines to a temperature that reduces or prevents contact burn injuries.

The American Society for Testing Materials (ASTM) has developed Designation: C1055-92 titled "Standard Guide for Heated System Surface Conditions that Produce Contact Burn Injuries," and Designation: C1057-92 titled "Standard Practice for Determination of Skin Contact Temperature from Heated Surfaces using a Mathematical Model and Thermesthesiometer." ASTM C1055-92 establishes a process for the determination of an acceptable surface operating condition for heated systems, and states in summary that "Personal injury resulting from contact with heated surfaces can be prevented by proper design of insulation systems or other protective measures." ASTM C1057-92 establishes a procedure for evaluating the skin contact temperature of heated surfaces.

Typically, the insulating materials used for insulating pipes or tubes for the above-described purpose are fibrous materials, foamed materials, or other flexible insulants that can be shaped. These insulating materials have air- or gas-filled pockets, which will retard heat flow. The thermal conductivity of these insulating materials varies with density. Compressing these insulating materials increases density by reducing the air- or gas-filled spaces, which in turn increases the thermal conductivity. The increase in thermal conductivity increases heat loss and surface temperature.

The "isolated" tracer lines must have a consistent and uniform level of heat transfer between the tracer line and the process pipe so that predictable and reliable results are achieved to prevent over heating or under heating sensitive process lines.

A prior art method of continuously applying insulation to pipe or long coils of tube involved the helical winding of thin strips of thermal insulation material in an overlapping fashion. Multiple passes of helical wound insulation strips are applied and built-up to the desired thickness. The helical winding method of applying thermal insulation is a relatively slow process whereby large rolls of insulating material are typically rotated around the tube or pipe. Only insulating material of relatively high mechanical strength can be applied otherwise tearing of the insulating material will result. Generally, insulating material with high mechanical strength is denser resulting in increased thermal conductivity and lower thermal performance of the system. Inconsistency in the mechanical strength of the insulating material and the breaking force of the apparatus for applying the insulating material caused frequent tears in the insulating material resulting in substantial reduction in production efficiency. Inconsistency in the mechanical strength also caused variation in compression of the insulating material as it was applied to the tube or pipe resulting in variation of the finished outer diameter and variation in heat losses throughout the finished product. To arrive at a somewhat smooth surface, this method required the application of many thin layers of insulating material to minimize the height of the overlapping edges, otherwise a helical ridged spiral appeared on the finished surface of the product. Application of thin layers of insulating material aggravated the problem of tearing and slowed production efficiency.

U.S. Pat. No. 3,259,533 discloses a method and apparatus of advancing a strip of insulating material together with tubing in the longitudinal direction of the tubing through a stationary funnel-shaped die which compresses the strip of insulating material around the circumference of the tubing and captures the insulating strip as it exits the funnel-shaped die by helically winding a wire around the insulating material. The wire-wound insulated pipe can then be covered with a plastic coating for providing a moisture impervious pipe.

U.S. Pat. No. 3,594,246 discloses a method and apparatus of advancing a strip of insulating material together with tubing in the longitudinal direction of the tubing through a stationary funnel-shaped matrix which compresses the strip of insulating material around the circumference of the tubing and captures the insulating strip as it exits the funnel-shaped matrix by helically winding a tape around the insulating material.

U.S. Pat. No. 4,307,053 discloses a method and apparatus for guiding a strip of compressible insulating material lengthwise through a folding shoe and wrapping the strip material around a pipe and compressing portions of the strip material to increase the density of the strip material at the edges of the strip.

The prior art apparatus and methods in U.S. Pat. Nos. 3,259,533 and 3,594,246 discussed above describe continuously applying thermal insulation to tubes and pipes in a linear application of long strips of insulation material through a funnel-shaped compressing die. The insulating material is formed across its narrow axis into a cylindrical shape around the tube or pipe. Linear application of the insulating material eliminates forces that tear helical wound insulating materials resulting in significantly increased production efficiency. Production line speed is increased because of the elimination of rotating heavy rolls of insulating material and associated apparatus around the tube. Production line speed is also increased because thicker layers of insulating material may be applied without concern for creating helical ridges on the finished surface of the product. In the attempt to produce a product that has lower thermal conductivity, lower density insulating materials may be applied using this method. However, the advantage of applying lower density insulating material is offset in the prior art methods because of the compression created by the funnel-shaped compressing die. In the '533 and '246 patents, the insulating strips are compressed around the circumference of the tube or pipe. As the insulating strip and tube or pipe passes through the compressing die the oversized insulating strip is folded and compressed around the tube and immediately captured as it leaves the die and before compression is released by encircling with a tape-like material. The tape-like material encircles both the edge of the tip of the compressing die and the exiting insulating strip preventing the radial expansion of the insulating strip and maintaining the compressive forces. Compression of the insulating material causes an increase in density of the insulating material resulting in a decrease in thermal conductivity and thermal performance. The compressive forces are not distributed equally and vary continuously around the radial axis of the insulating strip causing inconsistencies in heat loss and thermal performance. With this method, it is also very difficult to maintain continuous contact at the seam where the two longitudinal edges of the insulating strip meet.

It is desirable to be able to apply a continuous longitudinal strip of compressible insulating material to a pipe or tube in a manner whereby compression of the insulating material is substantially eliminated. This would provide the advantage of allowing the insulating material to retain its thermal conductivity or K value after application to the pipe or tube which would result in the use of a reduced thickness or fewer layers of the insulating strip and allow for predictable modelling of insulated tube surface temperatures and tracer conductances. It is also desirable that this be accomplished without any sacrifice in production efficiency.

BRIEF SUMMARY OF THE INVENTION

The present invention is a method and apparatus for applying a continuous longitudinal strip of compressible insulating material to a pipe or tube in a manner whereby compression of the insulating material is substantially eliminated. The present invention allows the insulating material to retain its thermal conductivity or K value after application to the pipe or tube resulting in the use of a reduced thickness or fewer layers of the insulating strip and allowing for predictable modelling of insulated tube surface temperatures and tracer conductances. The present invention utilizes the production efficiency advantages of linear application of insulating materials to a tube or pipe.

In the present invention, the tube passes through a tube positioning die located within a strip shaping die. The strip shaping die is funnel-shaped as the insulating material enters the strip shaping die. The tube is positioned such that a slight amount of pressure is applied near or to one edge of the insulating strip at an outermost tip at the exit end of a finishing die. The exit end of the finishing die opening spirals back from the outermost tip causing the effective cross-sectional exit diameter to become progressively larger from one edge of the insulating material to the other edge. This causes the pressure to relieve along the radial axis from one edge of the insulating strip at the furthermost extension of the outermost tip towards the other edge. The insulating strip is shaped and flows away from the pressure area across its radial axis until the edges meet at the exit point of the finishing die. Any compression occurring within the finishing die is relieved at the exit point of the outermost tip. The insulating strip is captured in place by helically wound tape at or beyond the exit point of the finishing die tip. Under certain conditions, the frictional forces of the rotational helical winding of the tape tends to cause the insulating strip to drift within the finishing die in the direction of tape rotation, thus causing the edge of the insulating strip to become out of position relative to the furthermost extension of the finishing die tip. This can be eliminated by an insulation guide located within the strip shaping die along the axis directly behind the furthermost extension of the outermost tip. It can also eliminated by support members located midway within the strip shaping die along the same axis. The insulating strip flows through the strip shaping die with the edge positioned against the insulation guide and possibly the support members, thus overcoming any position drifting caused by the frictional forces of the rotational helical winding of the tape.

The method and apparatus of the present invention differs from the prior art in that the compression of the insulating material is eliminated thereby increasing the thermal performance of the finished product while reducing overall diameter for a given performance criteria and reducing the amount of insulating material needed to create the finished product.

BRIEF DESCRIPTION OF THE VIEWS OF THE DRAWINGS

In order to more fully understand the drawings referred to in the detailed description of the present invention, a brief description of each drawing is presented, in which.

DETAILED DESCRIPTION OF THE INVENTION

Figure 1:
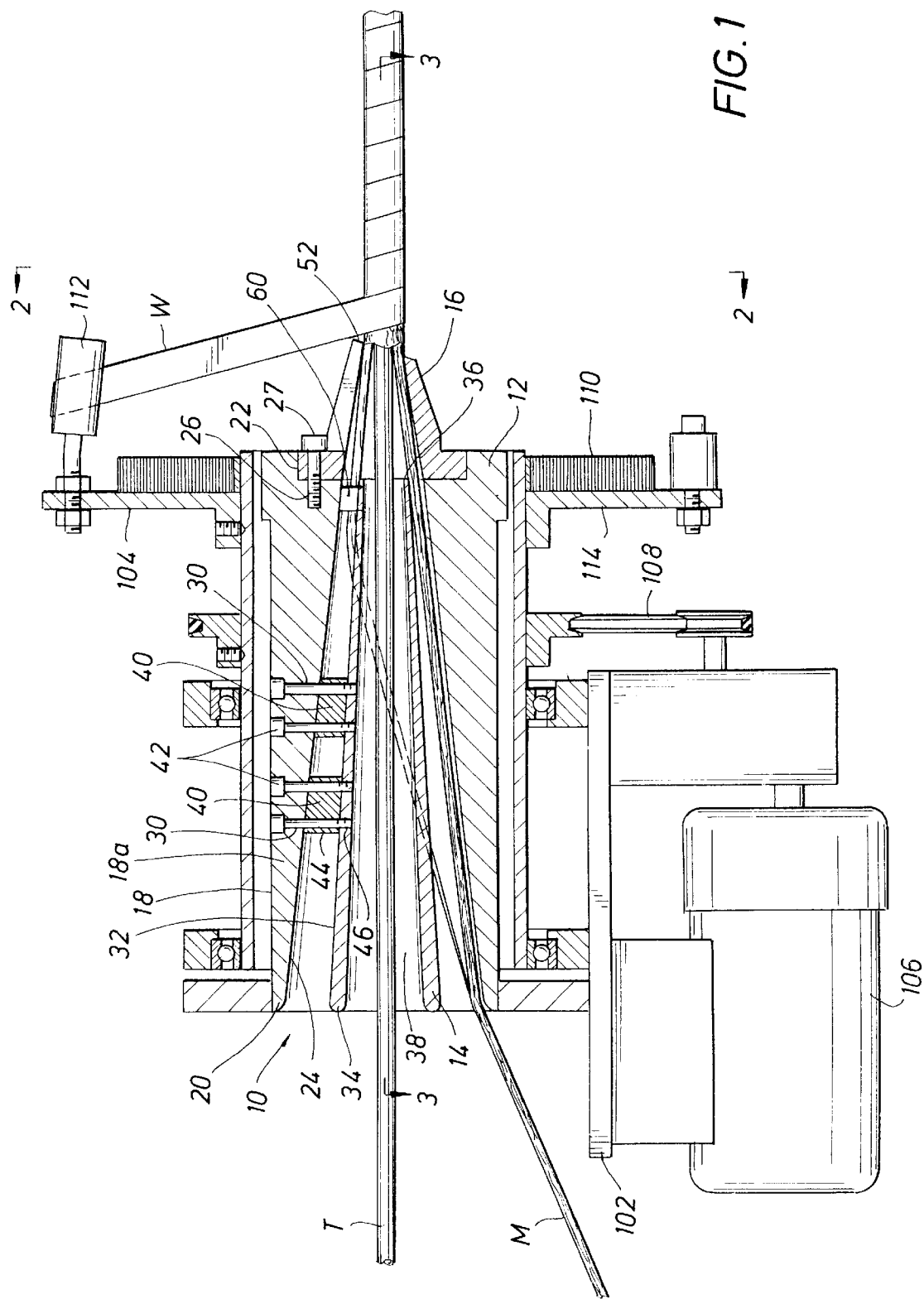
FIG. 1 is a side elevational view in partial cross-section showing the apparatus for the manufacture of a linear wrap, thermally insulated tube according to the preferred embodiment of the present invention.
Figure 3:
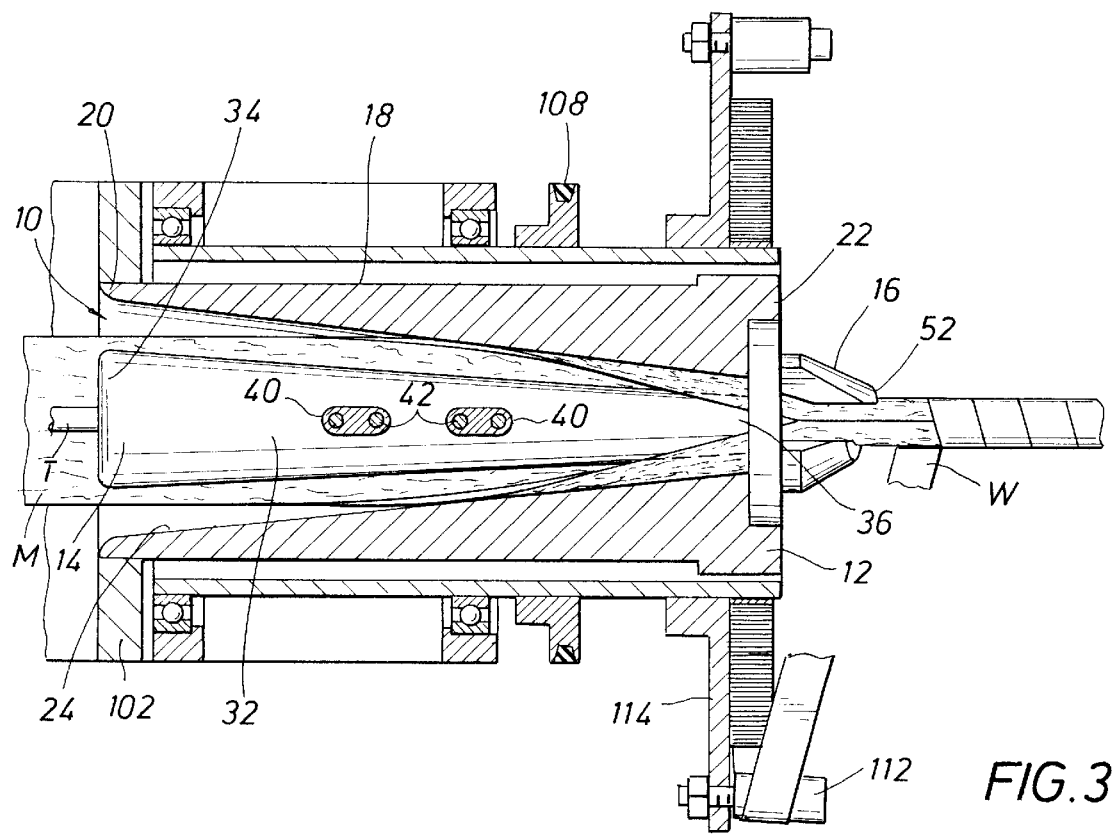
FIG. 3 is a view taken along line 3—3 of FIG. 1.

The method and apparatus of the present invention will now be described in more detail with specific reference to the drawings. The formation apparatus of the present invention, generally designated as 10, is shown in FIGS. 1 and 3. The formation apparatus 10 includes a strip shaping die 12, a tube positioning die 14, and a finishing die 16.

Referring to FIGS. 1 and 3, the strip shaping die 12 comprises an outer body 18, generally cylindrical in shape, having an entrance end 20 and an exit end 22. The outer body 18 has a bore 24 extending therethrough. The bore 24 is generally conical in shape and decreases in diameter from the entrance end 20 to the exit end 22. The exit end 22 of the outer body 18 is adapted to have the finishing die 16 mounted thereto. Referring to FIG. 1, the exit end 22 includes a plurality of threaded bores 26 for receiving threaded fasteners 27 extending through a corresponding plurality of mounting holes 28 (FIG. 6) in the finishing die 16. Referring to FIG. 1, preferably the outer body 18 includes at least one opening 30 extending through the wall 18a for providing a means of supporting the tube positioning die 14 within the strip shaping die 12 as will be explained below. In the preferred embodiment of the present invention, a plurality of openings 30 extend through the wall 18a in the outer body 18. Preferably, the openings 30 are axially aligned with the longitudinal axis of the bore 24 for reasons which will be explained below.

Referring to FIGS. 1 and 3, the tube positioning die 14 preferably comprises a truncated conical tubular member 32. The truncated conical tubular member 32 has a first end 34 and a second end 36. A tapered bore 38 extends longitudinally through the truncated conical tubular member 32. In the preferred embodiment of the present invention, the diameter of the tapered bore 38 at the second end 36 is slightly greater than the outer diameter of the tube T as shown in FIG. 1. This permits the tube T to freely pass through the tube positioning die 14 while also positioning or aligning the tube T as it enters the finishing die 16.

The tube positioning die 14 is mounted longitudinally within the strip shaping die 12 as shown in FIGS. 1 and 3. Preferably, the tube positioning die 14 is mounted with one or more support members 40 and a plurality of mounting bolts 42. The support members 40 are secured between the outer surface of the tube positioning die 14 and the outer body 18 of the strip shaping die 12 with the mounting bolts 42. Preferably, the support members 40 include bores 44 therethrough and the tube positioning die 14 includes tapped bores 46 for threadably engaging the mounting bolts 42. The support members 40 and mounting bolts 42 ensure and maintain the proper alignment of the tube positioning die 14 within the strip shaping die 12. In the preferred embodiment of the present invention the mounting bolts 42 can also be used to make minor adjustments to the positioning and/or tilt of the tube positioning die 14 relative to the finishing die 16 for reasons which will be explained below.

Referring to FIG. 1, the tube positioning die 14 preferably has a thin wall at the second end 36. Preferably, the tube positioning die 14 has a thicker wall at the first end 34 which gradually thins as it approaches the second end 36. It is to be appreciated that the thin wall second end 36 forms a transition wherein the tube T and the strip of insulating materials M are allowed to come into contact with each other.

Figure 2:
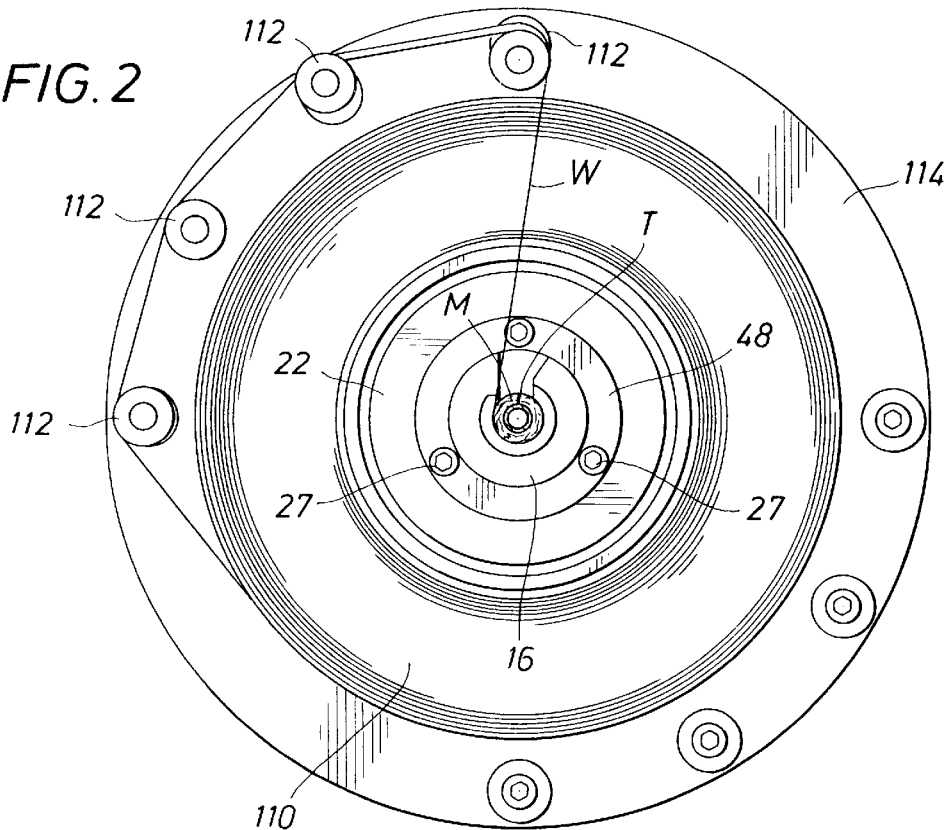
FIG. 2 is a view taken along line 2—2 of FIG. 1.
Figure 4:
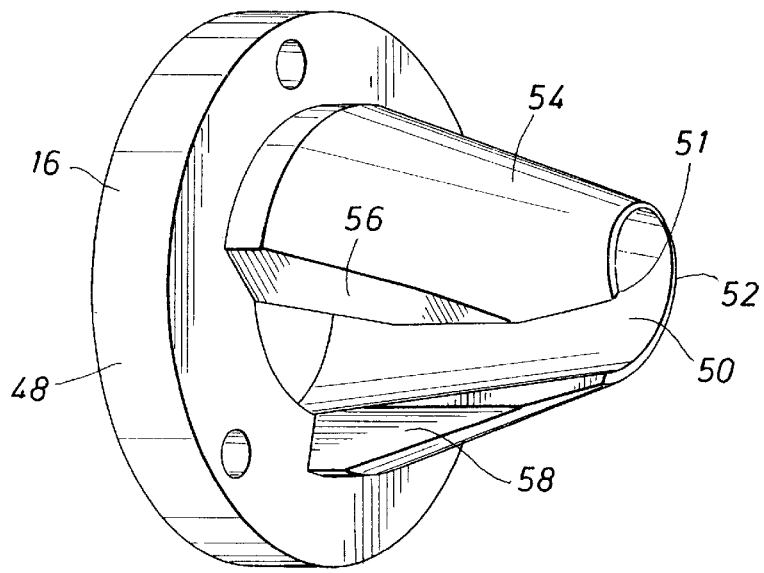
FIG. 4 is a perspective view of a finishing die according to the preferred embodiment of the present invention.
Figure 5:
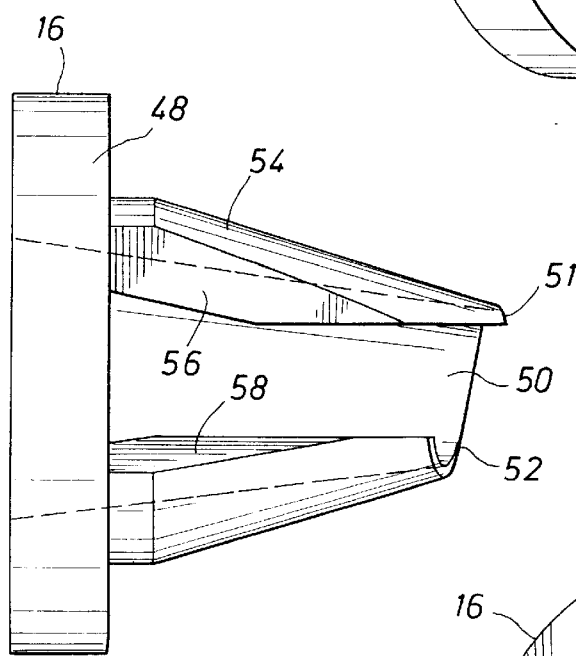
FIG. 5 is a side elevational view of the finishing die of FIG. 4.
Figure 6:
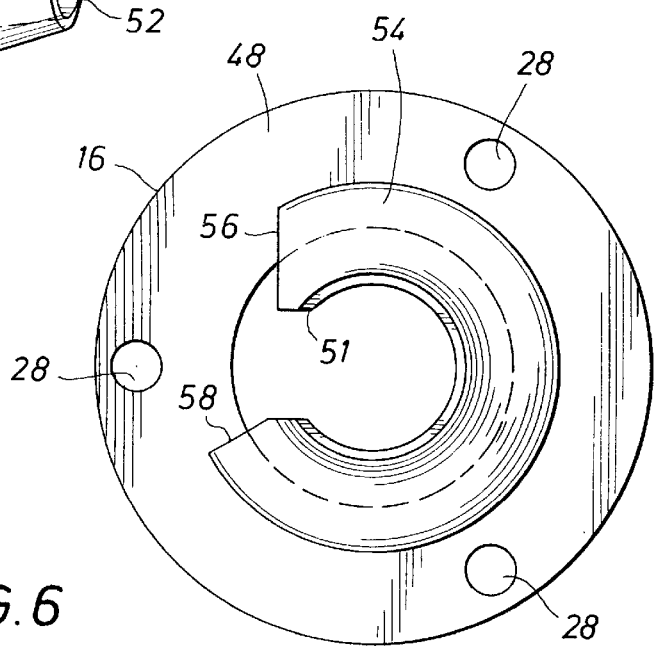
FIG. 6 is a front elevational view of the finishing die of FIG. 4.

The finishing die 16 is mounted to the exit end 22 of the outer body 18 of the strip shaping die 12. The finishing die 16 is mounted to the strip shaping die 12 with the plurality of threaded fasteners 27 as shown in FIGS. 1 and 2. Referring to FIGS. 4–6, the plurality of mounting holes 28 extend through a flange 48 of the finishing die 16. The finishing die 16 includes a tapered throughbore 50 having its greatest diameter at the flange 48 and tapering to its smallest diameter at an end 52 of the finishing die 16. The diameter of the tapered throughbore 50 at the end 52 is approximately equal to the outer diameter of the tube T with a substantially uncompressed single wrap of insulating material M circumscribing the tube T as will be explained below. As shown in FIG. 1, the diameter of the tapered throughbore 50 at the flange 48 is approximately equal to the diameter of the bore 24 at the exit end 22. This ensures a smooth and orderly transition of the insulating strip M as it passes from the strip shaping die 12 to the finishing die 16.

As shown in FIG. 5, the end 52 of the finishing die 16 is preferably helical-shaped. The helical-shaped end 52 results in an outermost tip 51. As a result of the tapered throughbore 50, the inner surface of the outermost tip 51 is closer to the longitudinal axis of the finishing die 16 than any other surface in the finishing die 16. Since the outermost tip 51 is the point of smallest radial distance from the longitudinal axis of the finishing die 16 and the tube T, the outermost tip 51 applies the tightest "grip" or compressive force on the insulating strip M while the remainder of the width of the insulating strip M can fold and slide freely around the circumference of the tube T inside the finishing die 16. Preferably, the outermost tip 51 applies the compressive force at or near a longitudinal edge of the insulating strip material M.

The finishing die 16 includes a tapered outer body 54 mounted to the flange 48. The tapered outer body 54 has a longitudinal cut-out section defined by walls 56 and 58.

Referring now to FIGS. 1–3, the machinery associated with the formation apparatus 10 will be generally described. It is to be understood that the machinery illustrated is typical of machinery used in the prior art. The formation apparatus 10 is mounted in a stationary position to a frame 102. A rotatably-mounted tape wrapping assembly 104 is rotatably driven by a power source, such as a motor 106. The motor 106 rotates the tape wrapping assembly 104 via a drive belt 108. A spool 110 of tape W is mounted on the tape wrapping assembly 104. It is also to be understood that instead of tape, wire or like material may be used.

The tape W feeds off the spool 110 and extends over a plurality of rollers 112 mounted to a plate 114 of the tape wrapping assembly 104. Preferably, the rollers 112 are mounted to the plate 104 in such a manner that the tape W will spirally wrap around the insulating strip M at a point just beyond the tip 51 of the finishing die 16. Thus, as the tape wrapping assembly 104 rotates about the longitudinal axis of the tube T and formation apparatus 10, the tape W will automatically form an overlapping spiral wrap on the insulating strip M as it is fed through the formation apparatus 10.

The method of manufacturing the linear wrap, thermally insulated tube will now be described in more detail. While not shown in the drawings, preferably the tube T is a long length of tubing which is wrapped onto a spool. The tubing T comes off the spool and preferably feeds longitudinally into the tapered bore 38 of the tube positioning die 14. Similarly, a long length of insulating strip material M is preferably wrapped onto a spool in a flat and unfolded position such that as the insulating material M comes off of the spool, the insulating material M is a generally flat strip having a width approximating the circumference of the tube T. The insulating strip M feeds into the bore 24 of the strip shaping die 12 as shown in FIGS. 1 and 3. The insulating strip material M is in a substantially planar condition as it enters the entrance end 20 of the strip shaping die 12.

Referring to FIGS. 1 and 3, the unwrapped, bare tube T passes longitudinally through the tube positioning die 14 located within the strip shaping die 12. The insulating strip M enters the strip shaping die 12 in the substantially planar condition at the entrance end 20 but folds or curves around the outside of the tube positioning die 14 in the funnel-shaped bore 24 of the strip shaping die 12 as the insulating strip M approaches the exit end 22 of the strip shaping die 12. The insulating strip M is segregated from the tube T by the tube positioning die 14. The folding or curving of the insulating strip M in the bore 24 of the strip shaping die 12 is accomplished without compressing the insulating strip M to any significant degree. The only compressing of the insulating strip M in the strip shaping die 12 is that resulting from the gentle folding process, which compression is negligible.

Preferably, the tube T is positioned such that a slight amount of pressure is applied near or to one edge of the insulating strip M at the outermost tip 51 at the exit end 52 of the finishing die 16. The exit end 52 of the finishing die opening 50 spirals back from the outermost tip 51 causing the effective cross-sectional exit diameter to become progressively larger from one edge of the insulating material M to the other edge. This causes the pressure to relieve along the radial axis from one edge of the insulating strip M at the furthermost extension of the outermost tip 51 towards the other edge. The insulating strip M is shaped and flows away from the pressure area across its radial axis until the edges meet at the exit point 51 of the finishing die 16. Any compression occurring within the finishing die 16 is relieved at the exit point of the tip 52. The insulating strip M is captured in place by helically wound tape W at or beyond the exit point of the finishing die tip 52. Typically, the tape W is applied to the insulating strip M at approximately two to three inches from the outermost tip 51. Under certain conditions, the frictional forces of the rotational helical winding of the tape W tends to cause the insulating strip M to drift within the finishing die 16 in the direction of tape rotation, thus causing the edge of the insulating strip M to become out of position relative to the furthermost extension of the outermost tip 51. This is eliminated by the insulation guide 60 (FIG. 1) located within the strip shaping die 12 along the axis directly behind the furthermost extension of the outermost tip 51. It is also eliminated by the support members 40 located midway within the strip shaping die 12 along the same axis. The insulating strip M flows through the strip shaping die 12 with the edge positioned against the insulation guide 60 and possibly also positioned against the support members 40, thus overcoming any position drifting caused by the frictional forces of the rotational helical winding of the tape W.

The positioning and/or tilt of the tube positioning die 14 can be altered or adjusted by the mounting bolts 42 and the support members 40. The positioning and/or tilt adjustment for the tube positioning die 14 will allow adjustments to be made to the amount of compressive force applied to the insulating strip M at the outermost tip 51.

While not shown in the drawings, sometimes it is desirable to cover the tape-wound insulated pipe with a coating. For example, it may be desirable to provide a moisture barrier for the tape-wound insulated pipe. In such instances, a plastic coating can be applied to the tape-wound insulated pipe by various methods such as an extrusion process.

It is to be understood that the method and apparatus of the present invention is not limited to applying an insulating material to an uncoated pipe but can be used to apply a linear wrap material to a tube or pipe having a generally round cross-section. The tube or pipe may already have an outer coating or layer prior to applying the linear wrap material. Oftentimes, the tube or pipe may have multiple layers of insulating material. In this instance the tube is first wrapped with an insulating strip and wound with tape as described above and the process is repeated for each additional layer of insulating material added to the pipe. It is to be understood that the formation apparatus 10 will be sized accordingly to accommodate the increasing diameter of the insulated tube with each added layer.

Typically, the thermally insulated tube comprises a small diameter pipe or tube T having a diameter in the range of approximately 0.25" to 1.0". The tube T is oftentimes made from copper but may also be made from other materials from which tubes are commonly made, including but not limited to plastic, metal and stainless steel. The tube T typically has a longitudinal bore therethrough although the present invention could also have application to applying a linear wrap of material around an elongate cylindrical solid member. The insulation M is typically a compressible material, as for example, fiberglass, but other types of materials can also be used in accordance with this invention.

It is to be understood that the thermally insulated tube made according to method and apparatus of the present invention has a continuous longitudinal strip of compressible insulating material M circumscribing the tube or pipe T. The compressible insulating material M is installed in such a manner that compression of the insulating material M is substantially eliminated. The method and apparatus of the present invention allows the insulating material M to retain its thermal conductivity or K value after application to the tube T which results in the use of a reduced thickness or fewer layers of the insulating strip M and allows for predictable modelling of insulated tube surface temperatures and tracer conductances. Another important factor is that the thermal conductivity is very consistent and uniform along the length of the insulated tube. Furthermore, it is to be understood that the thermally insulated tube made according to the method and apparatus of the present invention can be manufactured approximately two to four times faster than the prior art insulated tube products wherein the insulating layer was helically or spirally wound on the tube.

Having described the invention above, various modifications of the techniques, procedures, material and equipment will be apparent to those in the art. It is intended that all such variations within the scope and spirit of the appended claims be embraced thereby.

What is claimed is:

1. A method of forming a linear wrapped tube from a generally planar strip material and a tube, and a formation die having a tapered bore, a helical-shaped exit end and an outermost tip, the method comprising the steps of:

longitudinally advancing the tube in the tapered bore;

introducing the generally planar strip material into the formation die;

longitudinally advancing and folding the strip material within the tapered bore; and initially applying a compressive force to the strip material at the outermost tip of the helical-shaped exit end.

2. The method of claim 1, wherein the applied compressive force is a point force at the outermost tip.

3. The method of claim 1, further comprising the step of:

guiding a longitudinal edge of the strip material to the outermost tip of the helical-shaped exit end.

4. The method of claim 1, further comprising the step of:

spirally wrapping tape around the strip material and tube as they exit the exit end.

5. An apparatus for continuously forming a generally planar strip material longitudinally around a tube, the apparatus comprising:

a formation die having a first end, a second end and a bore therethrough extending from said first end to said second end, at least a portion of said bore having a tapered diameter, said tapered bore portion extending to said second end and having a diameter greater near said first end than at said second end, and said second end being helical-shaped.

6. The apparatus of claim 5, wherein said formation die and said bore have a common longitudinal axis extending from said first to second ends and said helical-shaped second end has an outermost tip forming a point of smallest radial distance from said common longitudinal axis.

7. The apparatus of claim 5, wherein said tapered bore portion includes a longitudinal cut-out section.

8. The apparatus of claim 7, wherein said longitudinal cut-out section extends to said second end.

9. The apparatus of claim 6, wherein said tapered bore portion includes a longitudinal cut-out section.

10. The apparatus of claim 9, wherein said longitudinal cut-out section extends to said second end and is adjacent said outermost tip.

11. The apparatus of claim 5, wherein the diameter of said tapered bore portion at said second end is approximately equal to the outer diameter of the tube with a substantially uncompressed single wrap of the strip material circumscribing the tube.

12. The apparatus of claim 5, wherein said formation die further comprises a strip guide mounted in said bore for guiding a longitudinal edge of the strip material.

13. The apparatus of claim 6, wherein said formation die further comprises a strip guide mounted in said bore for guiding a longitudinal edge of the strip material, said strip guide positioned to guide the longitudinal edge of the strip material to said outermost tip.

14. The apparatus of claim 5, wherein said formation die further comprises a tube positioning die having a throughbore, said tube positioning die mounted longitudinally within said bore of said formation die.

15. The apparatus of claim 14, wherein said throughbore is tapered.

16. The apparatus of claim 15, wherein said tube positioning die has a tapered outer surface.

17. The apparatus of claim 15, wherein the tube extends through said throughbore and the strip material extends through said bore exterior of said tube positioning die.

18. The apparatus of claim 5, further comprising a tape wrapping assembly for spirally wrapping tape around the strip material and tube as it exits said second end of said formation die.

* * * * *